United States Patent Office 3,493,920
Patented Feb. 3, 1970

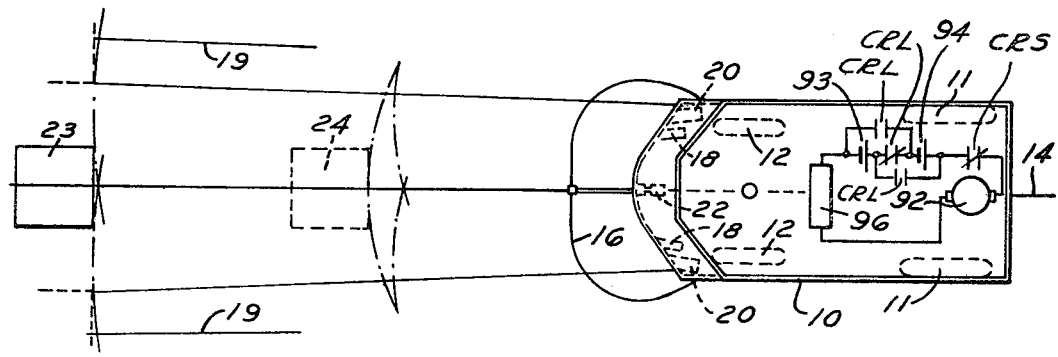
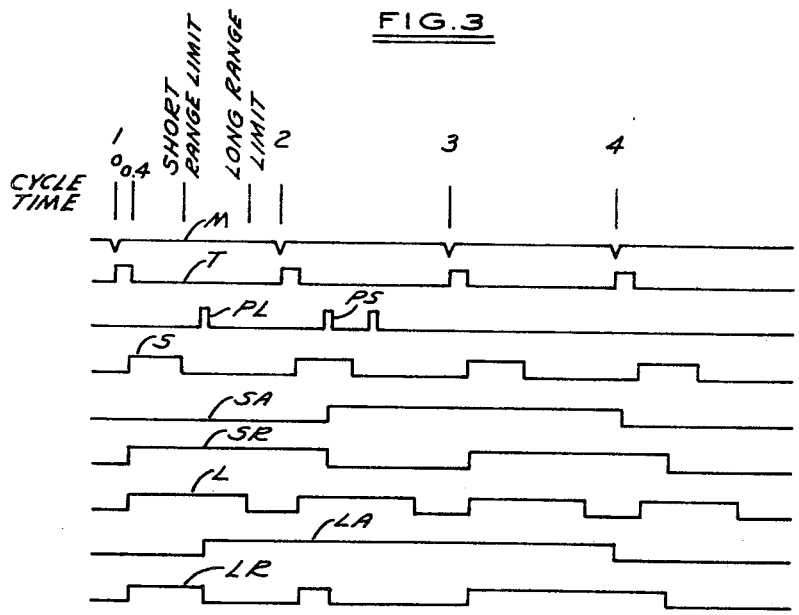

3,493,920
SONIC CONTROL FOR SELF-GUIDED VEHICLES
George D. MacMunn, Southfield, Mich., assignor to Jervis B. Webb Company, a corporation of Michigan
Filed Aug. 29, 1968, Ser. No. 756,095
Int. Cl. G01s 9/66
U.S. Cl. 340—1                                    23 Claims

ABSTRACT OF THE DISCLOSURE

A control for self-propelled automatically-guided vehicle incorporating equipment for cyclically transmitting a burst of sound in the direction of vehicle travel and detecting sound reflected from an obstruction at long and short ranges in advance of the vehicle, the long range representing a warning distance and the short range a safe stopping distance. A long range echo produces an output signal which is employed to reduce the vehicle speed, while a short range echo produces an output signal which commands the vehicle to stop, and an output signal is maintained throughout the cycle following the cycle in which it was produced. The control is used for safety purposes, and for blocking in multiple vehicle systems.

BACKGROUND OF THE INVENTION

Field of the invention

The invention relates to a sonic vehicle control system particularly for a vehicle of the driverless industrial tractor type capable of automatically following a guide path.

Description of the prior art

A vehicle of the driverless type requires some form of detecting device to sense an obstruction in the path of vehicle travel. To date, such detecting devices have been impact responsive, such as illustrated in U.S. Patent 2,920,713, and the difficulty with these inpact responsive devices is that they are subject to frequent damage.

Material handling systems employing a plurality of driverless vehicles operated simultaneously require some form of blocking control, such as illustrated in U.S. Patent 3,147,817 where inductive loops along the path of travel combined with vehicle mounted transmitters and receivers prevent a following vehicle from entering a block occupied by a preceding vehicle. Any form of blocking system obviously increases the cost of an installation.

DESCRIPTION OF THE INVENTION

In accordance with the present invention, one or more distances in advance of a vehicle are established, depending upon the speed and stopping characteristics of the vehicle. For the ordinary type of driverless tractor used in factories and warehouses, two distances are established, the first "long range" distance being used as a warning that the vehicle is approaching an obstruction; and, the second distance, referred to as "short range," is that at which the vehicle must be commanded to stop in order to reach a stand-still without contacting the obstruction. In some applications of the invention, for example to a lighter, quicker stopping vehicle, only a short range or stopping distance need be used. However, the present description of the invention will include long and short range distances as the modifications required to employ but one distance will be apparent to those skilled in this field.

The invention provides a sonic vehicle speed control system of the type operating on repetitive cycles, each cycle including a sound transmitting period and a listening period, the control system comprising equipment for transmitting a short burst of high frequency sound in the direction of vehicle travel at the beginning of each cycle; echo receiving equipment mounted on the vehicle for detecting an echo of the sound burst from an object at long and short range in advance of the vehicle and producing a corresponding long or short range echo signal; long and short range timing devices controlled by the transmitting equipment for respectively producing timing signals for a longer and a shorter interval following the initiation of each cycle, the longer and shorter intervals corresponding to the maximum long and short range distances in advance of the vehicle; and, an alarm circuit connected with the echo receiving equipment and with the long and short range timing device for emitting long and short range output signals in response to an echo signal received during the long and short range timing intervals, respectively, and for maintaining any such output signal active during the cycle following the cycle in which such output signal was emitted. A vehicle speed reducing control is operable in response to a long range output signal, and a vehicle stopping control is operable in response to a short range output signal.

Other features and advantages of the invention will appear from the following description of the preferred embodiment thereof illustrated in the accompanying drawings.

BRIEF DESCRIPTION OF THE DRAWING

FIGURE 1 is a schematic plan view of an industrial tractor equipped with the control of the invention;
FIGURE 3 is a schematic timing diagram illustrating the operation of the circuit of FIG. 2.

DESCRIPTION OF THE PREFERRED EMBODIMENT

Figure 2:
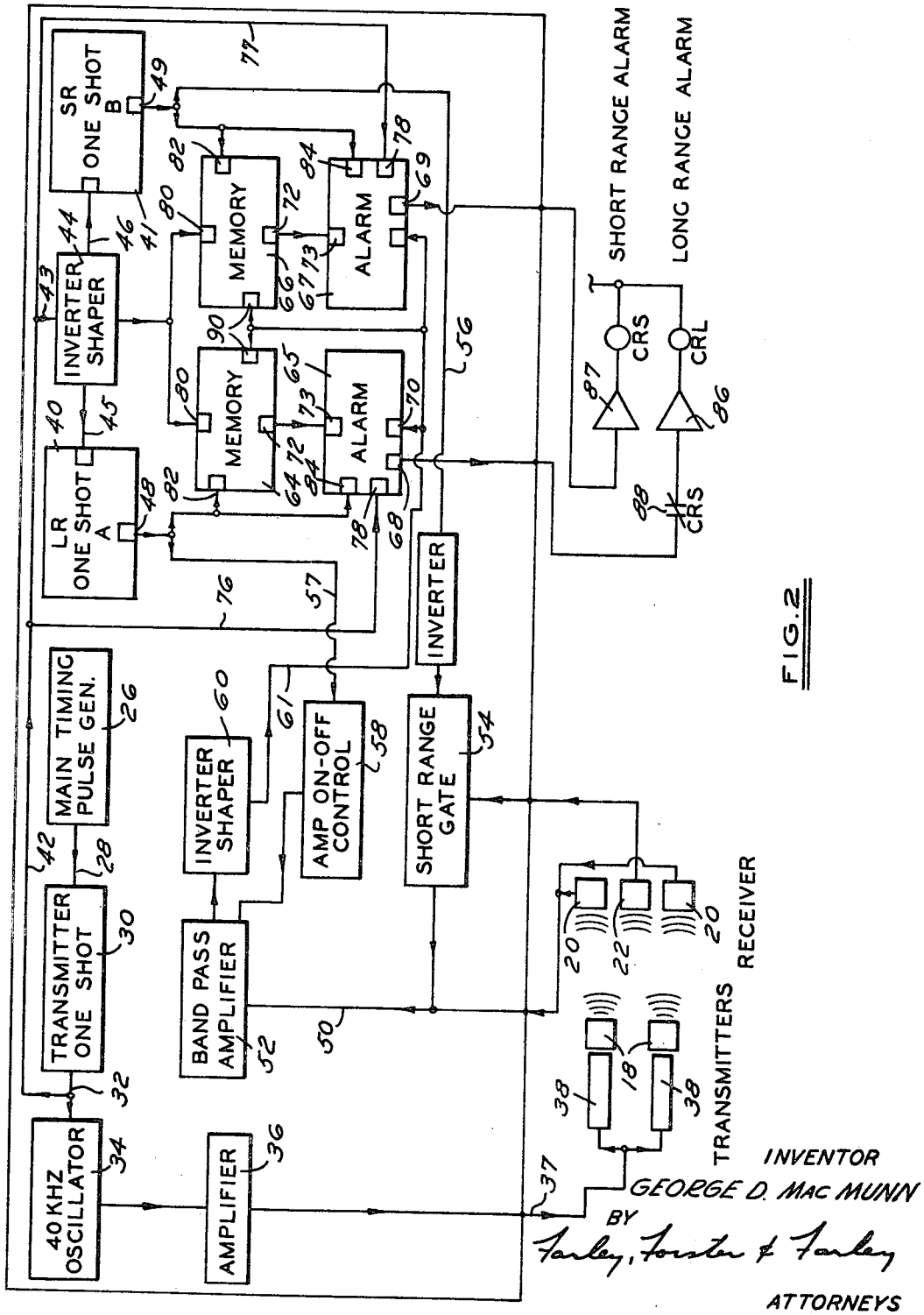
FIGURE 2 is a schematic circuit diagram of the control.

The industrial tractor 10, of FIG. 1, may be of the well-known self-propelled, battery powered type having rear driving wheels 11 and front steering wheels 12. Steering action of the front wheels 12 is automatically controlled in a known manner to cause the vehicle to follow a guide path defined by an energized guide wire 14, or alternately by a band of reflective tape. A resilient safety bumper 16, of the type previously mentioned, will cause the vehicle to stop if deflected by contact with an object, and acts as a secondary stopping or safety device with the control of the present invention.

This control includes a pair of sonic transmitters 18 mounted on the front of the vehicle, which are preferably of the type disclosed in U.S. Patent 2,967,957, each transmitter sending out a beam of sound in a pattern having an included angle of approximately 60°. The transmitters 18 are mounted on the truck 10 so that their sound beams converge and create a sound pattern of high intensity within the vehicle path of travel or area schematically illustrated within the side lines 19. A pair of direction sensitive long range echo receivers 20 are mounted on the front of the vehicle at either side thereof in converging relation to each other so as to detect reflected sound waves from an object or obstruction within the path of travel. A third direction sensitive short range receiver 22 is mounted at the front of the vehicle on the center line thereof.

The operation of the long and short range receivers is controlled so that the long range receivers are capable of detecting sound waves from the transmitters 18 reflected from an object 23 within a maximum long range distance in advance of the vehicle, while the short range receiver is capable of detecting sound waves reflected from an object 24 within a maximum short range distance in advance of the vehicle. The long and short range distances are selected in accordance with the speed and stopping characteristics of the vehicle; and long range distance being one at which the vehicle is commanded to reduce speed, and the short range distance being one within which the vehicle can be brought to a stop at the reduced speed without hitting the object. If the long and short range distances are each kept as low as is consistent with the overall objectives there is less likelihood of the control system being influenced by sound waves reflected from objects to either side of the vehicle path of travel. A control for an industrial tractor of the type under discussion may for example be designed with the maximum long range distance established at approximately fifteen feet, and the maximum short range distance at five feet.

The complete control system and its operation are illustrated in FIGS. 2 and 3. All of the components of the control system are individually known to those skilled in the art, and hence a schematic type of diagram has been selected to more simply illustrate the manner in which these components are inter-related.

As previously mentioned, a cyclical type of operation is employed. A main timing pulse generator 26, or unijunction transistor, generates a negative-going main timing pulse illustrated by the wave M, FIG. 3, at the beginning of each cycle. The time of each cycle will depend upon the maximum long range warning distance desired, but for industrial truck application a cycle time in the order of 200 msec. is satisfactory.

The main timing pulse M is fed through line 28 to a transmitter one-shot network 30, causing the one-shot to change state for a short interval and deliver an output pulse, illustrated by the line T, FIG. 3, through line 32 to an oscillator 34. The oscillator oscillates for the period of the timing pulse T, and the oscillator output is fed through an amplifier 36, through a co-axial cable 37 and to the primaries of tuned transformers 38, the secondaries of which drive the transmitters 18. For example, the oscillator 34 may operate at 40 kHz., and the amplifier 36 and transformers 38 are designed to drive the transmitters 18 with approximately 600 volts P—P sine wave at 40 kHz. for 0.4 msec., producing a burst of high frequency sound in the direction of vehicle travel at the beginning of each cycle.

The timing pulse T controlling the transmitters also controls long and short timing means 40 and 41, respectively, each timing means 40 and 41 consisting of a one-shot multi-vibrator network. Timing pulse T is fed through line 42 and line 43 to an inverter shaper circuit 44 and thence through line 45 to the long range one-shot 40 and line 46 to the short range one-shot 41. The output of the long range one-shot 40 at terminal 48 thereof is represented by the pulse line L of FIG. 3, while the output at terminal 49 of the short range one-shot 41 is represented by pulse S of FIG. 3. These long and short range timing signals L and S are used to regulate the operation of the echo receiving and alarm circuit portions of the control system.

Referring to FIG. 2, the long range receivers 20 are directly connected by line 50 to a timed amplifier 52. Output from the short range receiver 22 is also connected to amplifier 52 but through a short range gating transistor 54 which is controlled through connection 56 by the short range timing signal from the output 49 of the short range one-shot 41. The amplifier 52 is in turn regulated by the long range timing signal from output 48 of the long range one-shot 40, supplied through line 57 to an amplifier ON-OFF control network 58.

The long and short range timing signals from the one-shots 40 and 41, respectively, correspond to the time required for an echo of the transmitted burst of sound to be received from the maximum long and short range distances in advance of the vehicle. Hence by operation of the short range gate 54 controlled by the short range timing signal S, the amplifier 52 may only receive signals from the short range receiver R during the short range timing interval; and, the amplifier ON-OFF control network 58, regulated by the long range timing signal L, turns the amplifier off after the long range timing interval.

Output of the amplifier 52 is rectified, inverted and shaped in the network 60, and the resulting echo signal is delivered through line 61 to the alarm circuit portion of the control.

The alarm circuit includes a pair of long range components 64 and 65 and a pair of short range components 66 and 67. Each of these components 64–67 may consist of a flip-flop circuit such as manufactured by Engineered Electronics Company, Model Q416, having "logic" input terminals for supplying signals which determine whether the flip-flop will change state. Long range component 65 is capable of producing an alarm signal at its terminal 68 under certain conditions to be outlined below if an echo signal is applied to its input terminal 70, and will be referred to as the long range alarm. Long range component 64 functions to apply a holding or memory signal from its output terminal 72 to the reset logic input terminal 73 of the long range alarm, and will be referred to as the long range memory. Short range components 66 and 67 function in the same manner as the long range components 64 and 65 respectively, and will be referred to as the short range alarm 67 and short range memory 66.

A long range relay CRL is connected to the output terminal 68 of the long range alarm through a relay driver 86; similarly output terminal 69 of the short range alarm 67 is connected through a relay driver 87 to a short range relay CRS which may have a normally closed contact 88 in series with the long range relay CRL for dropping out the long range relay when a short range signal is received.

At the beginning of each cycle, the transmitter timing pulse T is applied through connections 76 and 77 to the reset terminals 78 of each of the long and short range alarms 65 and 67. This transmitter timing pulse T is also applied through the inverter shaper 44 to the input terminals 80 of each of the long and short range memories 64 and 66. Then, the long and short range timing signals L and S from the long and short range timing means 40 and 41 are respectively applied to the logic terminals 82 of the long and short range memories 64 and 66 and the logic terminals 84 of the long and short range alarms 65 and 67.

Each alarm component 65 and 67 has two states. Considering the long range alarm component 65, one of these states is an "off" condition in which no alarm output signal is delivered from terminal 68 and the component is monitoring an echo signal delivered to the input or "set" terminal 70, and can only change to the other or "on" condition if such an echo signal is received during the time a set logic signal is supplied to terminal 84, or in other words during the interval established by the long range timing signal. The alarm can be "reset" from the ON to the OFF condition by application of a signal to the reset terminal 78 and will change state if this signal is received while a reset logic signal is applied to the reset logic terminal 73. This reset logic signal depends in turn upon the state of the memory component 64.

The memory component 64 has a normal condition in which an output signal is delivered from terminal 72, providing the reset logic for the alarm component 65. The memory component changes state to a holding condition if an echo signal is applied to the reset terminal 90 while a reset logic signal is being applied to the logic terminal 82, or in other words during the interval established by the long range timing pulse.

The short range alarm and memory components are identical except for the fact that the set logic signal applied to the terminal 84 of the short range alarm 67 and the reset logic signal applied to the reset logic terminal 82 of the short range memory 66 are each determined by the duration of the short range timing pulse.

Operation of the control system is graphically illustrated in FIG. 3. At the beginning of each cycle, the main timing generator pulse M initiates the timing pulse T from the transmitter one shot which, as previously explained, corresponds to the duration of the burst of sound from the transmitters 18.

This timing pulse T initiates the short and long range timing signals S and L; and, also initiates the normal long and short range reset logic signals LR and SR which are supplied respectively from the output 72 of the long and short range memories 64 and 66 to the reset logic input 73 of the long and short range alarms 65 and 67.

FIG. 3 illustrates the receipt of an echo pulse PL during the first cycle and following the short range portion thereof. At the time this echo pulse is received and applied to both the long range and short range alarms 65 and 67, the latter alarm is no longer capable of changing state because no enabling logic signal S is being applied to the terminal 84. The short range memory 66 cannot change state either because of the absence of a reset logic signal S at terminal 82. Consequently there is no change in the short range alarm output signal SA or in short range reset logic signal SR.

Since the echo pulse PL is received while the long range alarm and memory components 65 and 64 are each being supplied with the long range timing logic signal L, the long range alarm changes state and produces a long range alarm output signal LA at terminal 68 energizing the relay CRL, while the long range memory component 64 also changes state, dropping the long range reset logic signal LR to the reset logic terminal 73 of the long range alarm.

At the beginning of the second cycle, the timing pulse T applied to the reset terminal 78 of the long range alarm will not be effective to cause the alarm to change state because the absence of a reset logic signal LR at terminal 73 operates as a memory or holding signal to prevent the long range alarm from turning off.

Echo signals are illustrated in FIG. 3 as being received in the second operating cycle during both the long and short range intervals. The short range echo signal PS turns on the short range alarm 67 as shown by the rise in the short range alarm signal SA, and turns off both the long and short range memories 64 and 66 as shown by the drop in the long range and short range reset logic signals LR and SR. The short range alarm signal SA will energize the short range alarm relay CRS, de-energize the long range alarm relay CRL through the contact 88, and cause the vehicle to stop.

During the third cycle of operation illustrated in FIG. 3, no echo signal is received. The long and short range memories 64 and 66 are turned on by the timing pulse T applied to their input terminals 80 at the beginning of this cycle, and in the absence of an echo signal, remain turned on. Hence at the beginning of the fourth cycle, the timing pulse T applied to the reset terminals 78 of the long and short range alarms 65 and 67 will turn the alarms off because a reset logic signal is present at the terminals 73 at the time of the resetting timing pulse is received.

FIG. 1 includes a schematic illustration of the manner in which movement of the vehicle is regulated by the control. A conventional form of self-propelled industrial vehicle is electrically driven, having a driving motor 92 powered by a plurality of batteries 93 and 94 connected to the motor through a conventional holding type of control circuit 96, which when closed to initially start the vehicle, tends to remain closed. When the long range alarm relay CRL is energized, the speed of the vehicle is reduced by opening a normally closed CRL contact connecting the batteries in series and closing a pair of normally open CRL contacts connecting the batteries in parallel, thereby reducing the power supply to the motor 92; and, when the short range alarm relay CRS is energized, a normally closed CRS contact in series with all of the batteries is opened causing the motor 92 to stop. The condition of the motor control circuit 96 is not changed. Hence, if a long range alarm output signal energizes the relay CRL, the vehicle slows to and proceeds at a reduced speed until the long range output signal ceases or a short range alarm output signal energizes the CRS relay and causes the vehicle to stop. When the short range alarm output signal ceases and both relays are de-energized, the vehicle will start and proceed at normal speed; and, if the long range alarm relay CRL is de-energized before a short range alarm output signal causes the vehicle to stop, the vehicle will resume its normal speed.

Thus the control is operable for blocking, or maintaining a minimum spacing between following vehicles in a multiple vehicle system except on turns of relatively short radius where an auxiliary controlling device will be necessary, but the expense of providing blocking control will ordinarily be reduced considerably compared to that for installing a conventional type of blocking system.

I claim:

1. A sonic speed control for an automatically guided vehicle having a driving motor operable to propel the vehicle at a normal speed comprising:

means for transmitting periodic bursts of high frequency sound in the direction of vehicle travel;

echo receiving means for detecting an echo of a sound burst from an object in the path of vehicle travel within an established warning distance in advance of the vehicle;

alarm means connected with the echo receiving means for producing an output signal in response to the detection of an echo;

vehicle speed reducing means operable in response to an output signal; and, a driving motor control operable to return the vehicle to normal speed upon the cessation of an output signal.

2. A sonic speed control according to claim 1 further comprising timing means controlling operation of the echo receiving means for an interval following each sound burst corresponding to the time required to receive an echo of the sound burst from an object at said established warning distance in advance of the vehicle.

3. A sonic speed control according to claim 1 further comprising timing means controlling operation of the alarm means for an interval following each sound burst corresponding to the time required to receive an echo of the sound burst from an object at said established warning distance in advance of the vehicle.

4. A sonic speed control according to claim 1 further comprising timing means controlling operation of the echo receiving and alarm means for an interval following each sound burst corresponding to the time required to receive an echo of the sound burst from an object at said established warning distance in advance of the vehicle.

5. A sonic speed control according to claim 1 wherein the echo receiving means includes long and short range receiving components, the alarm means includes long and short range output signal components, and timing means connected to at least one of the short range receiving and output components to control the operation thereof for an interval corresponding to the time required to receive an echo of the sound burst from an object at an established short range warning distance in advance of the vehicle.

6. A sonic speed control according to claim 1 wherein the alarm means includes means for maintaining an output signal active for an interval at least equal to the time between successive sound bursts.

7. A sonic speed control according to claim 1 wherein the alarm means comprises alarm and memory flip-flop circuit components each having set, output, reset and logic terminals, means connecting the set terminal of each component to the echo receiving means whereby said output signal appears at the output terminal of the alarm component, the output terminal of the memory component being connected to the reset logic terminal of the alarm component to maintain said output signal active until the state of the memory component is changed.

8. A sonic speed control according to claim 7 further comprising means for applying a resetting pulse to the reset terminals of the alarm and memory components with each sound burst.

9. A sonic speed control according to claim 8 further comprising timing means for producing a timing signal for an interval following each sound burst, such interval corresponding to the time required to receive an echo from an object at said established distance in advance of the vehicle; and circuit means applying said timing signal to the set logic terminals of the alarm and memory components whereby said components are able to change state only in response to an echo signal detected during the timing signal interval.

10. A sonic speed control according to claim 9 further comprising circuit means utilizing the timing signal to inactivate the echo receiving means after the timing signal interval.

11. A sonic speed control according to claim 1 wherein the means for transmitting periodic bursts of sound comprises a pair of beam type transmitters mounted on the vehicle in spaced relation transversely thereof and in converging relation of the transmitted sound beams.

12. A sonic speed control according to claim 11 wherein the echo receiving means includes a pair of direction sensitive long range echo receivers mounted on the vehicle in spaced relation transversely thereof and in converging relation to each other, and a direction sensitive short range echo receiver mounted on the vehicle intermediate the long range receivers.

13. A sonic speed control according to claim 12 further comprising timing means for inactivating the short range echo receiver after an interval following each sound burst corresponding to the time required to receive an echo from an object at an established short range warning distance in advance of the vehicle.

14. A sonic speed control according to claim 12 wherein the echo receiving means includes an amplifier connected to the long range echo receivers and connected to the short range receiver through a gating means; and long and short range timing means for respectively producing long and short range timing signals for a longer and a shorter interval following each burst of sound, said longer and shorter intervals corresponding to the time required to receive an echo from an object at maximum established long range and short range warning distances in advance of the vehicle, said gating means utilizing the short range timing signal to disconnect the short range echo receiver from the amplifier after the short range timing interval, and an amplifier on-off control utilizing the long range timing signal to activate the amplifier only during the long range timing interval.

15. A sonic speed control according to claim 14 wherein the alarm means includes long and short range components connected to the amplifier, and means applying the long and short range timing signals to the long and short range components respectively to enable the production of long and short range output signals thereby only during the long and short range timing intervals.

16. A sonic speed control according to claim 15 wherein the vehicle speed reducing means includes a first control element responsive to a long range output signal and a second control element responsive to a short range output signal, the first control element being operable to reduce the vehicle speed to a level at which the second control is operable to reduce the vehicle speed to zero within the established short range warning distance.

17. A sonic vehicle speed control system of the type operating on repetitive cycles, each cycle including a sound transmitting period and a listening period, comprising;

means for transmitting a short burst of high frequency sound in the direction of vehicle at the beginning of each cycle;

echo receiving means mounted on the vehicle for detecting an echo of the sound burst from an object in the path of vehicle travel within long range and short range warning distances in advance of the vehicle and producing an echo signal;

long and short range timing means for respectively producing timing signals for a longer and a shorter interval following the initiation of each cycle, said longer and shorter intervals corresponding to the times required to receive an echo from an object at maximum long range and short range warning distances in advance of the vehicle; and, alarm circuit means connected with said echo receiving means and with said long and short range timing means for emitting long and short range output signals in response to an echo signal received during the long and short range timing intervals, respectively, and for maintaining any such output signal active during the cycle following the cycle in which such output signal was emitted.

18. A sonic vehicle speed control system according to claim 17 further comprising a vehicle speed reducing control operable in response to a long range output signal, and a vehicle stopping control operable in response to a short range output signal.

19. A sonic vehicle speed control system according to claim 17 wherein said sound transmitting means includes means for generating a main timing pulse signal at the beginning of each cycle.

20. A sonic vehicle speed control system according to claim 19 wherein said main timing pulse signal is applied to trigger said long and short range timing means.

21. A sonic vehicle speed control system according to claim 20 wherein said alarm circuit means include long and short range components having logic inputs for a resetting signal responsive to said main timing pulse, a listening interval signal from said long and short range timing means respectively activating said long and short range components during the long and short range listening intervals, and a holding signal resposive to the production of an echo signal during the immediately preceding cycle, the holding signal over-riding the resetting signal.

22. A sonic vehicle speed control system according to claim 17 wherein said echo receiving means include a long range and a short range echo receiver mounted on the vehicle, and circuit means controlled by said long and short range timing means for rendering said long and short range receivers respectively active during the long and short range timing intervals.

23. A sonic vehicle speed control system according to claim 22 wherein said echo receiving means includes an amplifier connected to the long and short range receivers, said circuit means including a gate between the short range receiver and amplifier controlled by the short range timing means, and an amplifier on-off circuit controlled by the long range timing means.

References Cited

UNITED STATES PATENTS

| 2,974,304 | 3/1961 | Nordlund | 340—1 X |
| 3,152,236 | 10/1964 | Merlo | 343—7 |
| 3,290,490 | 12/1966 | Auer. | |
| 3,321,737 | 5/1967 | Russell | 340—1 |
| 3,337,866 | 8/1967 | Gisonno | 343—7 |
| 3,370,166 | 2/1968 | Rold et al. | 340—1 X |
| 3,394,342 | 7/1968 | Walker | 340—1 |

RICHARD A. FARLEY, Primary Examiner

U.S. Cl. X.R.

343—7